US00RE43241E

(19) United States
(12) Reissued Patent
Kim

(10) Patent Number: US RE43,241 E
(45) Date of Reissued Patent: Mar. 13, 2012

(54) ELECTRODE ASSEMBLY FOR SECONDARY BATTERY AND METHOD FOR FABRICATING THE SAME

(75) Inventor: Chang-Seob Kim, Chonan-shi (KR)

(73) Assignee: Samsung SDI Co., Ltd., Gongse-dong, Giheung-gu, Yongin-si, Gyeonggi-do (KR)

(21) Appl. No.: 12/885,019

(22) Filed: Sep. 17, 2010

Related U.S. Patent Documents

Reissue of:
(64) Patent No.: 6,329,097
Issued: Dec. 11, 2001
Appl. No.: 09/292,483
Filed: Apr. 15, 1999

(30) Foreign Application Priority Data

Sep. 3, 1998 (KR) ..... 98-36259

(51) Int. Cl.
*H01M 2/18* (2006.01)

(52) U.S. Cl. ..... 429/94; 429/60; 429/129; 429/144

(58) Field of Classification Search ..... None
See application file for complete search history.

(56) References Cited

U.S. PATENT DOCUMENTS 5,746,780 A * 5/1998 Narukawa et al. ..... 29/623.1
5,925,482 A * 7/1999 Yamashita ..... 429/130

* cited by examiner

*Primary Examiner* — Jonathan Crepeau
(74) *Attorney, Agent, or Firm* — Robert E. Bushnell, Esq.

(57) ABSTRACT

A roll electrode assembly of a secondary battery includes a positive electrode rolled having a plurality of turns, a negative electrode rolled having a plurality of turns, and first and second separators each rolled to have a plurality of turns. Each turn of the first separator is disposed between each outer surface of the turns of the negative electrode and each inner surface of the turns of the positive electrode. Each turn of the second separator is disposed between each outer surface of the turns of the positive electrode and each inner surface of the turns of the negative electrode. The thickness of the second separator is thinner than that of the first separator.

11 Claims, 4 Drawing Sheets

(AMENDED)

Fig. 1 *(Prior Art)*
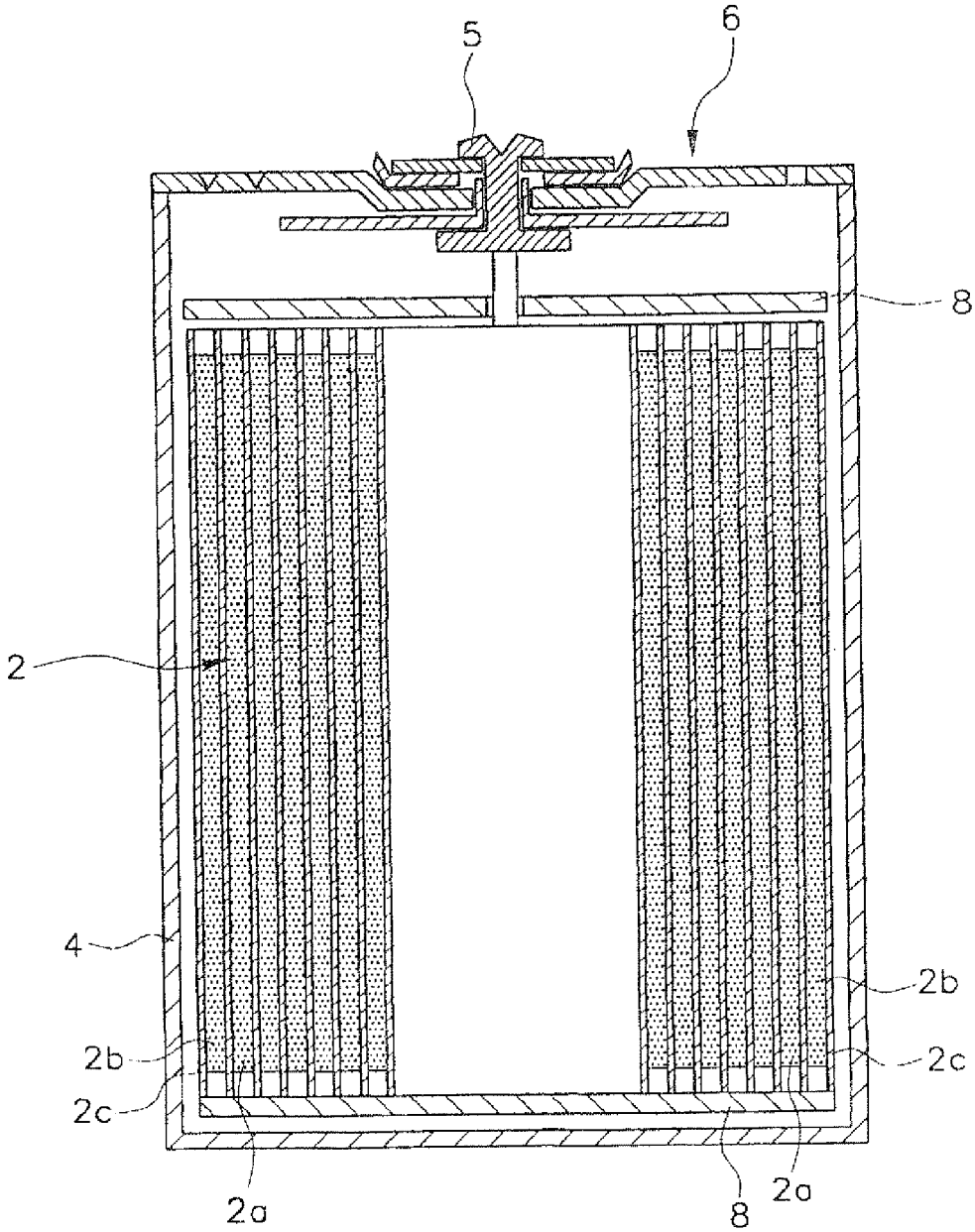

Fig. 2 *(Prior Art)*
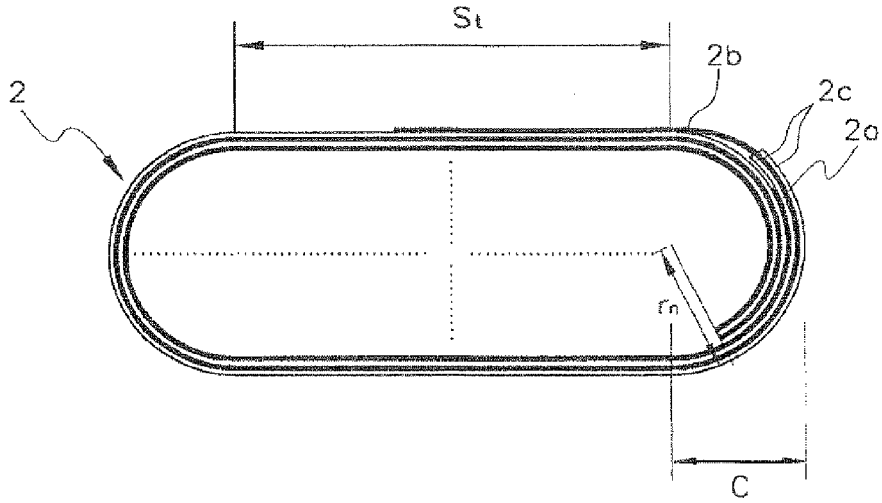
Fig, 3 (AMENDED)
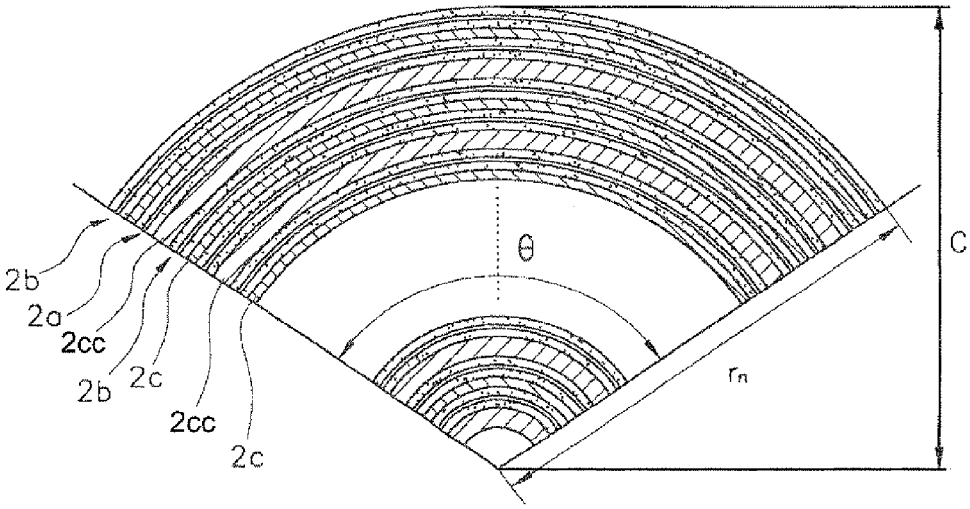

Fig. 5 *(Prior Art)*
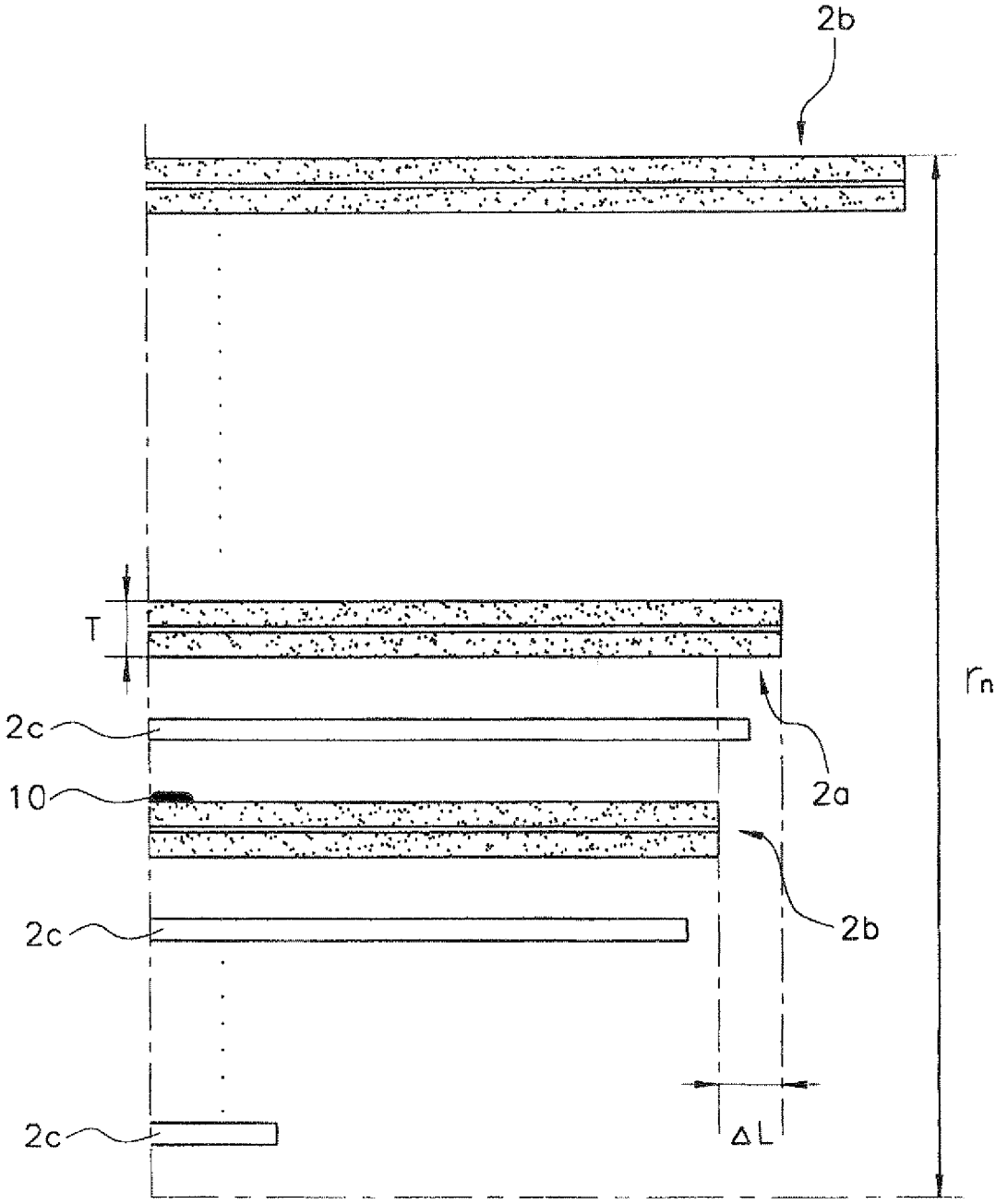

ELECTRODE ASSEMBLY FOR SECONDARY BATTERY AND METHOD FOR FABRICATING THE SAME

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a secondary battery and, more particularly, to an electrode assembly of a secondary battery, which is designed to enhance battery safety, and a method for making the same.

2. Description of Prior Art

A secondary battery comprises an electrode assembly disposed within a can containing an electrolyte. The electrode assembly comprises positive and negative electrodes on which positive and negative active materials are deposited respectively. Therefore, the charging and discharging of the second battery is realized by the physical and chemical reactions occurring between active materials and the electrolyte.

In such a secondary battery, a capacity ratio of the negative active material to the positive active material (N/P ratio) is usually maintained within a range of 1.2-1.4 to obtain a reserve for sufficient absorption of ions released from the positive electrode into the negative electrode.

If the N/P ratio is less than 1, a metal oxide material is precipitated within the secondary battery or the electrolyte may leak since ions discharged from the positive electrode cannot be completely absorbed into the negative electrode. This [result] *results* in the deterioration of the charging and discharging performance or in the explosion of the battery by increased internal pressure.

Secondary batteries are classified into several types depending on their shape: a cylindrical type, a package type and a prism type. For example, the prism type secondary battery, since the electrode assembly is rolled having an oval section, it is very difficult to provide the suitable N/P ratio throughout the entire surface of the electrode assembly.

This will be described more in detail with reference to FIGS. 1-5.

FIG. 1 shows a conventional prism type secondary battery.

The conventional prism type secondary battery comprises a can 4, a roll electrode assembly 2 disposed within the can 4, and a cap assembly 6 [close-tightly] *closely and tightly* mounted on an upper end of the can 4.

Rolling a group of plates makes the roll electrode assembly 2. That is, a separator plate, a negative electrode plate, another separator plate, and a positive electrode plate are, in this order, stacked to provide a group of stacked plates. The plate group is then rolled into the roll electrode assembly as shown in FIG. 2.

The cross section of the roll electrode assembly 2 is track-shaped so that it can be inserted into the prismatic rectangular can 4. As shown in FIG. 2, the roll electrode assembly 2 comprises positive and negative electrodes 2a and 2b, and separators 2c disposed between the positive and negative electrodes 2a and 2b. The track-shaped roll electrode assembly 2 has a straight section St and a curved section C.

The N/P ratio is determined depending on which electrode is disposed on the outer surface of the separator 2c. That is, when the curved section *"C"* of the roll electrode assembly 2 is unrolled in a flat state, as shown in FIG. [3] *5*, there is a length difference ΔL between the positive and negative electrodes 2a and 2b.

Therefore, a difference between the amount of the positive active material and the amount of the negative active material can be obtained according to the following equation:

$$A=\Delta L X T$$

where,

A is the difference between the amount of the positive active material and the amount of the negative active material;

ΔL is the length difference between the positive and negative electrodes; and

T is a thickness of the active material of the electrode.

The difference between the amount of the negative and positive active material causes variations in the capacity ratio difference between the *amount of negative active material and positive active material, respectively, of the* negative and positive electrodes *located* adjacent to each other with the separator disposed there between. That is, a region C where the N/P ratio is less than 1 appears on the roll electrode assembly 2 as shown in FIG. 4.

In the region C, the capacity of the positive electrode 2a is larger than that of the negative electrode 2b, as shown in FIG. 5. Therefore, the ions released from the positive electrode 2a are not [be] completely absorbed into the negative electrode 2b but precipitated as a metal oxide material 32 on a surface of the negative electrode 2b.

However, in the conventional battery, since the thickness of the separator 2c is uniform, the precipitated metal oxide material 10 continues to grow, then may penetrate the separator 2c, and contact the positive electrode 2a as charging and discharging are repeated. This may cause the battery to explode, deteriorating the safety of the secondary battery.

SUMMARY OF THE INVENTION

Therefore, the present invention has been made in an effort to solve the above-described problems of the conventional secondary battery.

It is an objective of the present invention to provide an electrode assembly for a secondary battery in which any hazardous problems, which may occur by the precipitation of the metal oxide, can be prevented, thereby improving safety of the secondary battery.

To achieve the above objective, the present invention provides a roll electrode assembly of a secondary battery including a positive electrode, a negative electrode, and first and second separators rolled *into* a plurality of turns.

The first separator is disposed between outer surface of the turns of the negative electrode and inner surface of the turns of the positive electrode. The second separator is disposed between outer surface of the turns of the positive electrode and inner surface of the turns of the negative electrode. The thickness of the second separator is less than that of the first separator.

Preferably, the thickness of the first separator is 2-3 times that of the second separator.

More preferably, the thickness of the first separator is about 30-45 μm, while the thickness of the second separator is about 15-23 μm.

When the roll electrode assembly is for a prism type battery, thus having, in a cross section, a straight portion and a curved portion, the thickness of the first and second separators are equal in the straight portion.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 1 is a side sectional view of a conventional secondary battery *taken from FIG. 1 of Applicant's U.S. Pat. No. 6,258,478 issued on 10 Jul. 2001,* where an electrode assembly according to a preferred embodiment of the present invention can be employed;

FIG. 2 is a plane view of a conventional electrode assembly;

FIG. 3 is an enlarged view illustrating a curved portion of a roll electrode assembly according to a preferred embodiment of the present invention;

FIG. 5 is a view illustrating an unrolled state of a conventional roll electrode assembly.

DETAILED DESCRIPTION OF PREFERRED EMBODIMENTS

Figure 4:
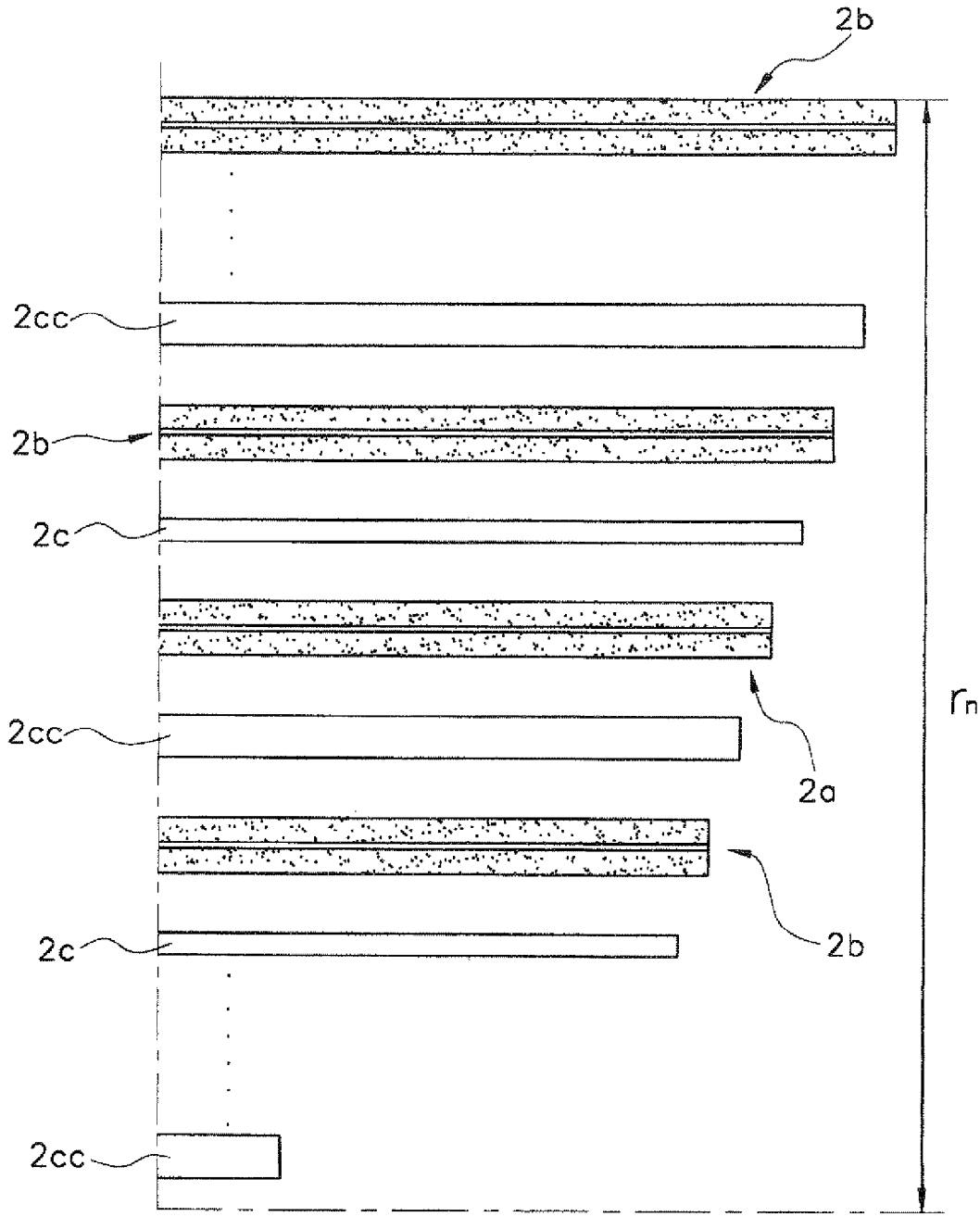
FIG. 4 is a view illustrating an unrolled state of a roll electrode assembly according to a preferred embodiment of the present invention.

Reference will now be made in detail to the present preferred embodiment of the invention, an example of which is illustrated in the accompanying drawing.

FIG. 3 shows a curved portion of a roll electrode assembly according to a preferred embodiment of the present invention.

The roll electrode assembly of the present invention is made by rolling a group of plates.

That is, the group of plates comprises a negative electrode 2b, first and second separators 2cc and 2c disposed on opposite surfaces of the negative electrode 2b, and a positive electrode 2a.

As a feature of the present invention, the thickness of the first separator 2cc is different from that of the second separator 2c.

Describing more in detail, in the roll electrode assembly, the first separator 2cc is disposed between the outer surface of the negative electrode 2b and the inner surface of the positive electrode 2a. The second separator 2c is disposed between the inner surface of the negative electrode 2b and the outer surface of the positive electrode 2a.

Therefore, as described above, in the curved portion of the roll electrode assembly, the adjacent negative and positive electrodes 2b and 2a, between which the first separator 2cc is disposed, has the N/P ratio less than 1. Accordingly, the first separator 2cc is designed to be greater than the second separator 2c.

That is, in the unrolled state of the roll electrode assembly as shown in FIG. 4, the first and second separators 2cc and 2c, which have a different thickness, are alternately disposed between the positive and negative electrodes 2a and 2b. Particularly, it is shown that the thickness of the first separator 2cc is greater than that of the second separator 2c. The thickness of the first separator is 2-3 times that of the second separator. More preferably, the thickness of the first separator is about 30-45 μm, while the thickness of the second separator is about 15-23 μm.

In the straight portion St of the roll electrode assembly which has no portion having [the] *a* N/P ratio less than 1, the thickness of the first separator 2cc may be equal to that of the second separator 2c.

Accordingly, the *cross-sectional* distance cut between adjacent positive and negative [electrode] *electrodes* where the N/P ratio is less than 1 becomes longer due to the thicker separator 2cc. As the result, even when the metal oxide material is precipitated and is grown due to the [length] difference *in local length* between the positive and negative electrodes at the curved portion of the roll electrode assembly, the precipitated metal oxide material can not penetrate the separator 2cc and *make* contact *with* the positive electrode, thereby preventing [the] *a* short circuit and *an* explosion of the battery.

It is to be understood that the form of the invention shown and described is to be taken as exemplary, presently preferred embodiments. Various modifications and changes may be made without departing from the sprit and scope of the invention as set forth in the claims. It is intended that the following claims be interpreted to embrace all such modifications and changes.

For example, the concept of the present invention may be applied to cylindrical type batteries that also have the N/P ratio less than 1 between the positive and negative electrodes.

What is claimed is:

1. A roll electrode assembly of a secondary battery, comprising:

a positive electrode deposited with a positive active material;

a negative electrode deposited with a negative active material [and] adjacent to the positive electrode; and

*successive turns of* a separator disposed between the positive and negative electrodes*, the successive turns having alternately different thicknesses*, wherein[, the] adjacent positive and negative electrodes have variable negative-to-positive active material [ratio] *capacity ratios*, and a thickness of the separator disposed between a portion of the adjacent positive and negative electrodes where the negative-to-positive active material *capacity* ratio is less than 1 is greater than [that] *a thickness* of [the] [other] *another* portion *where the capacity ratio is* higher than 1.

2. A roll electrode assembly of a secondary battery, comprising:

a positive electrode rolled having a plurality of turns;

a negative electrode rolled having a plurality of turns, each turn of the negative electrode being adjacent to each turn of the positive electrode; and first and second separators each rolled to have a plurality of turns, each turn of the first separator being disposed between each outer surface of the turns of the negative electrode and each inner surface of the turns of the positive electrode, and each turn of the second separator being disposed between each outer surface of the turns of the positive electrode and each inner surface of the turns of the negative electrode, wherein the thickness of the first separator is greater than that of the second separator, and wherein when the roll electrode assembly is for a battery having, in a cross section, a straight portion and a curved portion, with the thickness of the first and the second separators equal in the straight portion.

3. The roll electrode assembly of claim 2 wherein the thickness of the first separator is 2-3 times that of the second separator.

4. The roll electrode assembly of claim 2 wherein the thickness of the first separator is about 30-45 μm.

5. The roll electrode assembly of claim 2 wherein the thickness of the second separator about 15-23 μm.

6. A roll electrode assembly of a secondary battery, comprising:

a positive electrode deposited with a positive active material;

a negative electrode deposited with a negative active material [and] adjacent to the positive electrode;

a first separator disposed between the positive and negative electrodes; and a second separator disposed between the positive and negative electrodes[, wherein,]*;* the adjacent positive and negative electrodes [have] *having* variable negative-to-positive active material [ratio] *capacity ratios*, and *the first and second separators having different thicknesses, with* a thickness of the first separator disposed between a portion of the adjacent positive and negative electrodes where the negative-to-positive active material *capacity* ratio is less than 1 [is] *being* greater than [that of] a thickness of the second separator disposed between a portion of the adjacent positive and negative electrodes where the negative-to-positive active material *capacity* ratio is higher than 1.

7. The roll electrode assembly of claim 6 wherein the thickness of the first separator is 2-3 times that of the second separator.

8. The roll electrode assembly of claim 6 wherein the thickness of the first separator is about 30-45 μm.

9. The roll electrode assembly of claim 6 wherein the thickness of the second separator is about 15-23 μm.

*10. A roll electrode assembly of a secondary battery, comprising:*

*a positive electrode rolled into a plurality of turns;*

*a negative electrode rolled into a plurality of turns, each turn of the negative electrode being adjacent to each turn of the positive electrode; and*

*first and second separators each rolled to have a plurality of turns, each turn of the first separator being disposed between a corresponding neighboring outer surface of the turns of the negative electrode and a corresponding neighboring inner surface of the turns of the positive electrode, and each turn of the second separator being disposed between a corresponding neighboring outer surface of the turns of the positive electrode and a corresponding neighboring inner surface of the turns of the negative electrode;*

*a thickness of the first separator being greater than a thickness of the second separator in a curved portion of a cross-section of the secondary battery, and the thicknesses of the first and the second separators being equal in a straight portion of the cross-section of the secondary battery.*

*11. A roll electrode assembly of a secondary battery, comprising:*

*a positive electrode deposited with a positive active material;*

*a negative electrode deposited with a negative active material neighboring the positive electrode;*

*a first separator disposed between the positive and negative electrodes; and*

*a second separator disposed between the positive and negative electrodes;*

*adjacent positive and negative electrodes having variable negative-to-positive active material capacity ratios, and the first and the second separators having different thicknesses alternately positioned between the positive and negative electrodes, with a thickness of the first separator disposed between a portion of the adjacent positive and negative electrodes where the negative-to-positive active material capacity ratio is less than 1 being greater than a thickness of the second separator disposed between a portion of the adjacent positive and negative electrodes where the negative-to-positive active material capacity ratio is higher than 1; and*

*the thicknesses of the first and the second separators being equal in a straight portion of a cross-section of the secondary battery.*

* * * * *